United States Patent [19]

Wrench, Jr.

[11] 4,394,744

[45] Jul. 19, 1983

[54] REAL-TIME AMPLITUDE HISTOGRAM SHAPER

[75] Inventor: Edwin H. Wrench, Jr., San Diego, Calif.

[73] Assignee: The United States of America as represented by the Secretary of the Navy, Washington, D.C.

[21] Appl. No.: 234,063

[22] Filed: Feb. 12, 1981

[51] Int. Cl.³ .............................................. G06F 15/31
[52] U.S. Cl. .................................. 364/553; 358/166; 364/852
[58] Field of Search ...................... 364/553, 554, 852; 358/32, 37, 164, 166; 179/1 P

[56] References Cited

U.S. PATENT DOCUMENTS

| | | | |
|---|---|---|---|
| 3,622,770 | 11/1971 | Edelson | 364/852 |
| 3,979,555 | 9/1976 | Opitter et al. | 358/166 X |
| 3,983,320 | 9/1976 | Ketcham et al. | 358/166 |
| 4,020,286 | 4/1977 | Ceci | 364/554 X |
| 4,297,527 | 10/1981 | Pate | 179/1 P X |
| 4,315,319 | 2/1982 | White | 364/553 X |

OTHER PUBLICATIONS

O. R. Buhler et al., "Variable Gain Amplifiers", IBM Technical Disclosure Bulletin, vol. 21, No. 8, Jan. 1979, pp. 3094–3096.

Primary Examiner—Jerry Smith
Attorney, Agent, or Firm—Robert F. Beers; Ervin F. Johnston; John Stan

[57] ABSTRACT

A real-time amplitude histogram shaper transforms an input analog signal with a corresponding input amplitude histogram to an output signal with a specified output histogram. The histogram shaper comprises a histogram estimator, which estimates the amplitude histogram of an input analog signal. A calculator, whose input is connected to the output of the estimator, computes the transfer function required to transform the input signal to an output signal with the desired amplitude histogram. A controller, whose input is connected to the output of the calculator, generates control signals. A transfer function generator, whose input is connected to the output of the control signal generator, modifies its input signals by a ratio $P_{out}/P_{in}$. The gain $P_{out}/P_{in}$ is a function of $P_{in}$, that is, $P_{out}/P_{in} = g(P_{in}) \cdot P_{out}$ is the magnitude of the output parameter and $P_{in}$ is the magnitude of the input parameter, the output signal thereby having the desired amplitude histogram. Generally, the parameter P would be a voltage V.

1 Claim, 4 Drawing Figures

HISTOGRAM SHAPER

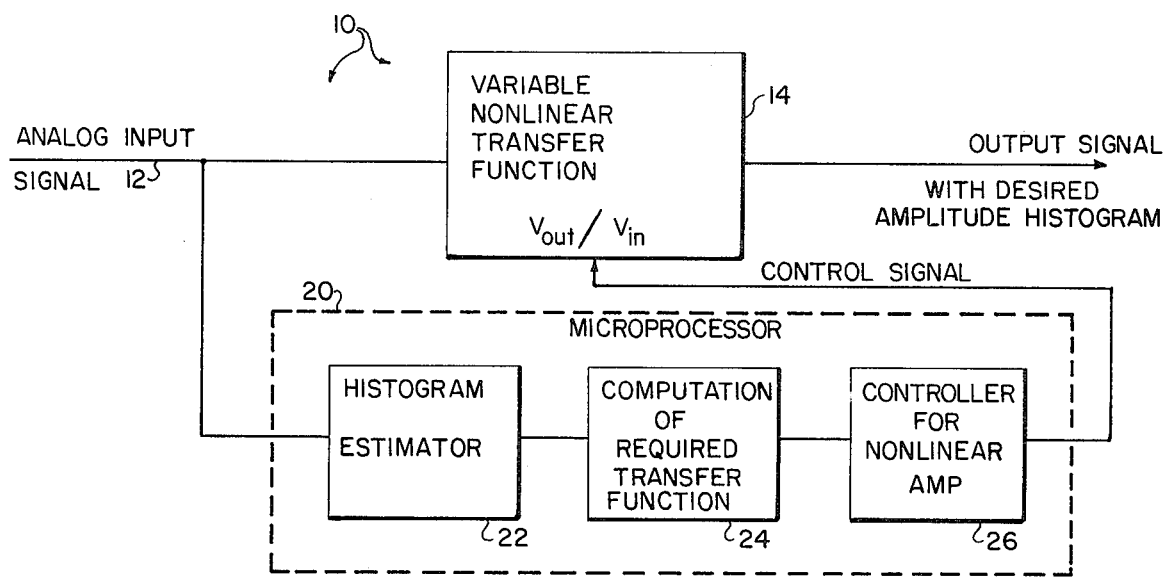
FIG. 1 HISTOGRAM SHAPER
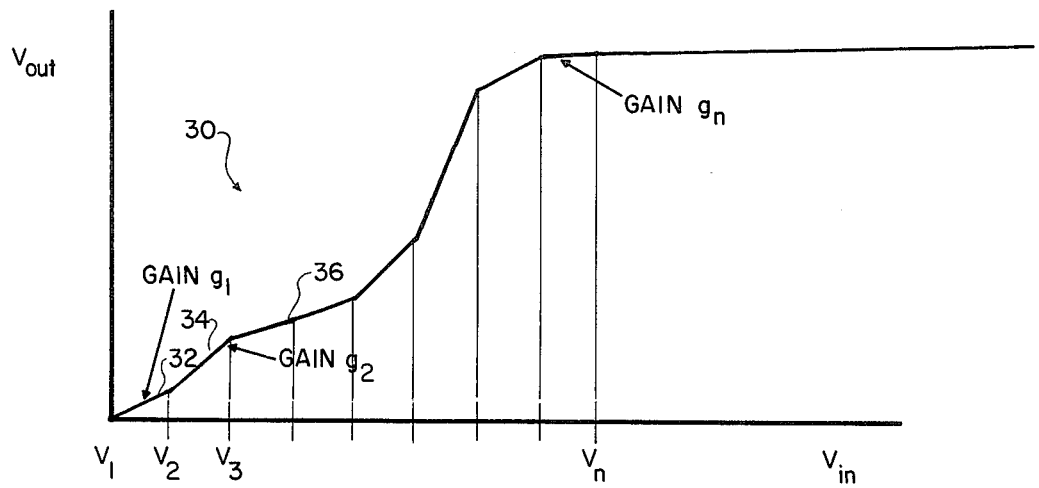
FIG. 2 TYPICAL NONLINEAR TRANSFER FUNCTION

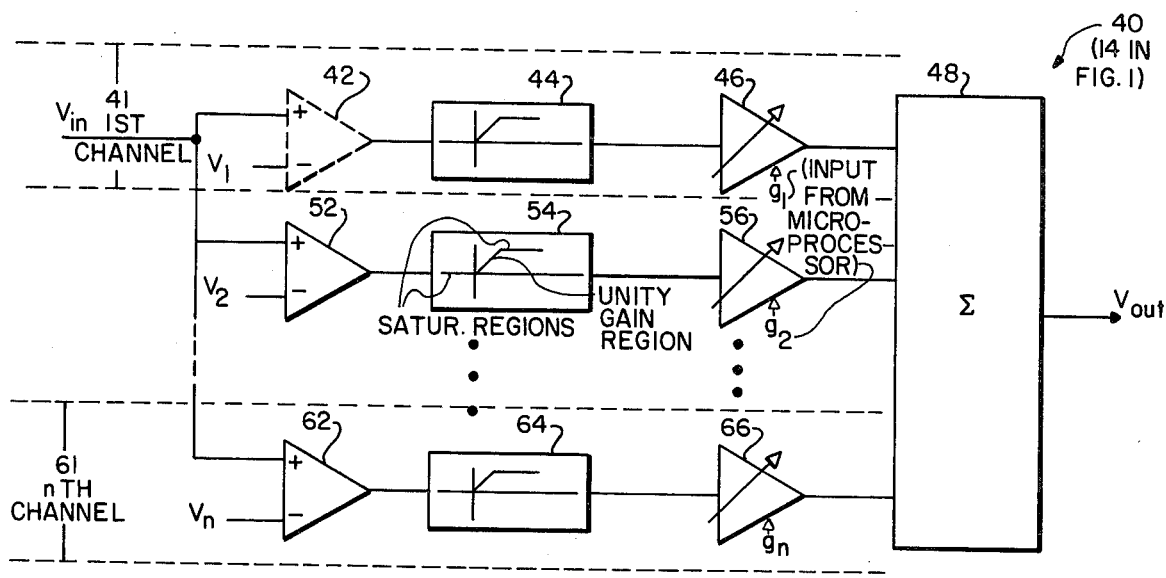
FIG. 3 CIRCUIT THAT PRODUCES VARIABLE NONLINEAR FUNCTION
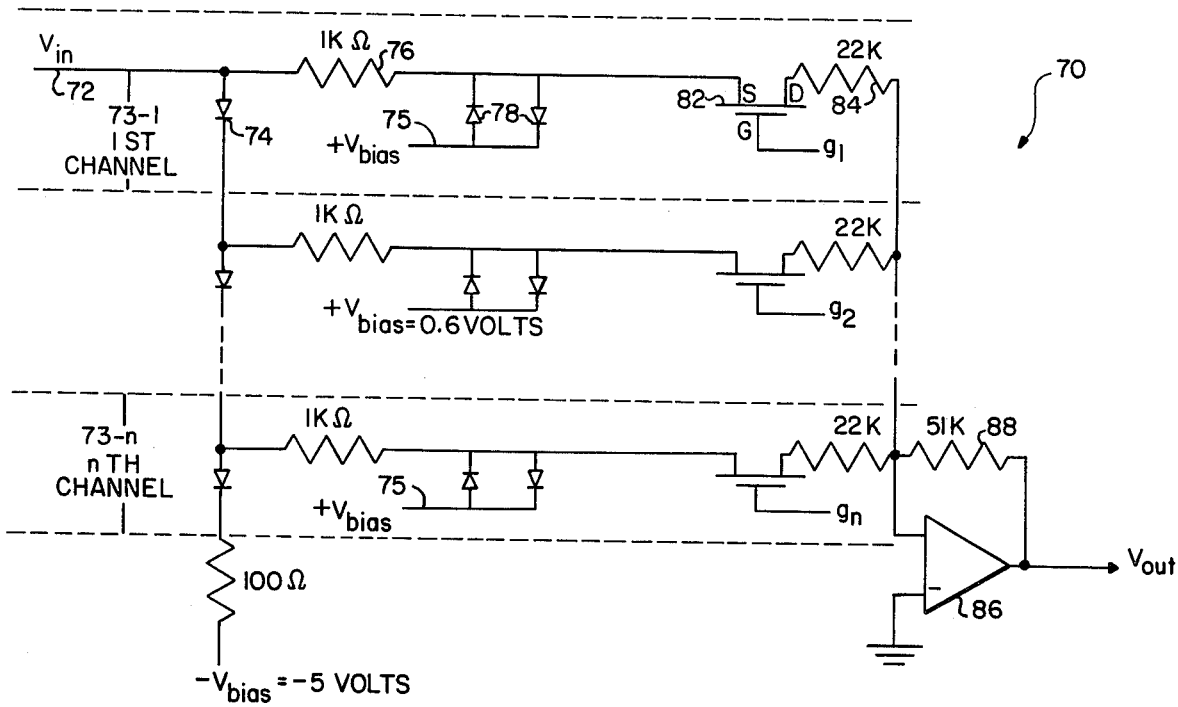
NOTE: $g_i$s ARE CONTROL VOLTAGES DETERMINED BY THE MICROPROCESSOR
FIG. 4 CIRCUIT USED AS A VARIABLE NONLINEAR FUNCTION GENERATOR

REAL-TIME AMPLITUDE HISTOGRAM SHAPER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Histogram modification has been used for some time to enhance images. However, these techniques are normally done in the computer and not in real-time.

The histogram could be modified in real-time by first digitizing the signal and then performing a nonlinear transformation with a table look-up memory. This technique requires sampling and digitizing the input signal at the Nyquist rate or higher. For video signals, this means very high-speed, high-power, analog-to-digital (A/D) converters and memories. Also, the images produced with this technique can have noticeable contouring because of the discrete nature of the digitized signal amplitudes.

This invention relates to a circuit which shapes the amplitude histogram of an analog signal source in real time. The histogram is continually estimated and used to update the transfer function of a nonlinear amplifier. One intended use is for contrast enhancement of television images in real time.

With the new approach, the required nonlinearity is accomplished with analog circuitry and the contouring problem should not exist. Second, since the input video scenes are slowly varying, the histograms will remain relatively constant for fractions of seconds or longer. Therefore, the histogram can be estimated from samples of the analog input signal taken at rates much below the Nyquist rate. Thus, a small low-power A/D converter can be used. Also, since the transfer function need only be updated at most a few times per second, a microprocessor can be used to control the transfer function. The microprocessor can run at relatively slow speed, resulting in low-power dissipation.

The implementation described herein has the potential of being produced in a very small package, and at low cost compared to an all-digital approach as used in the prior art.

SUMMARY OF THE INVENTION

The real-time amplitude histogram shaper transforms an input signal with a corresponding input amplitude histogram to an output signal with a specified output histogram. The histogram shaper comprises a histogram estimator, which estimates the amplitude histogram of an input analog signal. A calculator, whose input is connected to the output of the estimator, computes the transfer function required to transform the input signal to an output signal with the desired histogram. A controller, whose input is connected to the output of the calculator, generates control signals. A transfer function generator, whose input is connected to the output of the control signal generator, modifies its input signals by $g(P_{in}) = P_{out}/P_{in}$. $P_{out}$ is the magnitude of the output parameter and $P_{in}$ is the magnitude of the input parameter, the output signal thereby having the desired amplitude histogram. Generally, the parameter P would be a voltage V. The output parameter $P_{out}$ and the input parameter $P_{in}$ are generally voltages, $V_{out}$ and $V_{in}$, respectively. Therefore, for the purposes of this invention, a histogram is a plot of the average number of occurrences of the input signal $V_{in}$ within a given voltage region about a voltage versus that voltage.

OBJECTS OF THE INVENTION

An object of the invention is to provide a histogram shaper which operates in real time.

Another object of the invention is to provide such a shaper in which samples of the input signal may be taken at rates much below the Nyquist rate.

Yet another object of the invention is to provide a histogram shaper wherein the basic circuits can run at relatively slow speed, resulting in low-power dissipation.

These and other objects of the invention will become more readily apparent from the ensuing description when taken with the drawings.

BRIEF DESCRIPTION OF THE DRAWINGS

FIG. 1 is a block diagram of the histogram shaper of this invention.

FIG. 2 is a graph showing a typical nonlinear transfer function.

FIG. 3 is a schematic diagram of a circuit that produces a variable nonlinear function.

FIG. 4 is a schematic diagram of an actual circuit used as a variable nonlinear function generator.

DESCRIPTION OF THE PREFERRED EMBODIMENTS

Referring to FIG. 1, therein is shown a basic real-time amplitude histogram shaper 10 for transforming the input signal with a corresponding input amplitude histogram to an output signal with a desired amplitude histogram. The histogram shaper 10 comprises a means 22, whose input is adapted to receive an analog input signal $V_{in}$, for estimating the histogram of the input signal. A means 24, whose input is connected to the output of the histogram estimator 22, computes the transfer function required to transform the input signal to an output signal with the desired histogram. A means 26, whose input is connected to the output of the computing means 24, generates control signals.

The histogram estimator 22, the required transfer function computer 24 and the controller 26 could be implemented in the form of a microprocessor 20.

Means 14, whose control input is connected to the output of the control signal generator 26, modifies its input signals by the transfer function $g(P_{in}) = P_{out}/P_{in}(P_{in})$, where $P_{out}$ is the magnitude of the output parameter and $P_{in}$ is the magnitude of the input parameter, the output signal thereby having the desired amplitude histogram. Generally, $P_{out}$ and $P_{in}$ may be a parameter other than a voltage parameter. However in this invention, the output parameter $P_{out}$ and the input parameter $P_{in}$ are voltages, $V_{out}$ and $V_{in}$, respectively. The levels of amplitude are voltage levels of amplitude, $V_1, V_2 \ldots, V_n$.

In FIG. 1, the histogram estimator 22 may comprise a means for estimating the average number of occurrences of the input signal within a given voltage range versus the voltage as an independent parameter.

Referring now to FIG. 2, the transfer function computed by circuit 24, FIG. 1, comprises a series of gain functions $g_1, g_2, \ldots, g_n$. The gain function $g_1$ operates over the voltage range $V_2-V_1$, the gain function $g_2$ operates over the voltage range $V_3-V_2$, through the gain function operating over the voltage range $V_{n+1}-V_n$, where $V_{n+1}$ is the maximum voltage level.

Reference is now directed to FIG. 3, wherein the variable nonlinear transfer function generator, 14 in FIG. 1, is shown in more detail. In FIG. 3 the nonlinear transfer function means 40, which includes n channels, designated by reference numeral 41 for the 1st channel to numeral 61 for the nth channel, comprises a first plurality of n means 42, 52 and 62, for offsetting the input voltage. The voltage-offsetting, or voltage-translating, means 42 is shown in dashed lines inasmuch as the offsetting voltage $V_1$ may be set to zero, in which case means 42 would not be required. Each means, 42, 52 and 62, has as one input the signal $V_{in}$ and as the other input signal the inverted voltage $V_1, V_2, V_3, \ldots,$ or $V_n$. The means for voltage translation, 42, 52 and 62, offsets the input signal by the voltages, $V_1, V_2, \ldots, V_n$, respectively.

The circuit 40 also comprises a plurality of n saturating unity-gain amplifiers 44, 54, and 64, one in each of the n channels, 41 through 61. The diagrams within the blocks 44, 54 and 64 are amplifier voltage-transfer functions $V_{out}$ vs $V_{in}$. The inputs of the n saturating gain means, 44, 54 and 64, in the first through n-th channels, 41 through 61, are connected to the outputs of the n voltage-translating means, 42, 52 and 62. Each saturating gain means, 44, 54 and 64, passes only the signals corresponding to input signals within a specific voltage, $V_1-V_2, V_2-V_3, U_{n-1}-V_n$.

A second plurality of n means for amplifying, 46, 56 and 66, each have an input connected to the output of one of the saturating gain means, 44, 54 and 64. The means 46, 56 and 66, amplify the signals in the first through n-th channels by the quantity $g_1$ through $g_n$, respectively.

A means for summing 48, having n inputs connected to the n outputs of the second plurality of amplifying means, 46, 56 and 66, sums its input signals, the output signal of the summing means having the desired amplitude histogram. It should be noted that the output histogram is continuous at the various voltage levels, $V_1, V_2$ etc., despite the fact that the input histogram was estimated at discrete voltage levels.

FIG. 4 shows an actual circuit 70 used as a variable nonlinear function amplifier. The nonlinear amplifier 70 shown in FIG. 4, is one mode of implementing the generalized circuit 40 shown in FIG. 3. In this embodiment 70, the first plurality of means for offsetting the input voltage 42, 52 and 62 in FIG. 3, comprises n diodes 74 connected to the inputs of two adjacent channels, for example 73-1 and 73-2, the n-th means being connected to a source of bias voltage 75.

The plurality of n saturating unity-gain amplifier means, 44, 54 and 64 in FIG. 3, are implemented as a 1-kilohm resistor 76 in series in each channel, 73-1 through 73-n. One end of the resistors 76 in the first channel 73-1 is connected to the input signal $V_{in}$, in all of the other resistors 76 having one end connected to the junction of two diodes 74. The plurality of n saturating unity-gain means, 44, 54 and 64 of FIG. 3, also comprises a plurality of n double-diode clippers 78, one end of each being connected to the other end of the resistor 76, the other end of each being connected to a source of bias voltage, $V_{bias}$, 75.

The second plurality of means for amplifying, 46, 56 and 66 in FIG. 3, comprises, in FIG. 4, n field-effect transistors (FETs), 82. The source S of the FET 82 is connected to the junction of the resistor 76 and double-diode clipper 78. The gates G are connected to the controller 26 shown in FIG. 1.

A plurality of n 22k resistors 84, one end of each being connected to the drain D of FET 82, the other end being connected to another 22k resistor for the first through n-th channels, 73-1 through 73-n, comprises a part of the final element used in the variable nonlinear function generator 70. This final element is a means for summing 86, in the form of an operational amplifier whose input is connected to the junction of the n 22k resistors, 84.

Obviously, many other modifications and variations of the present invention are possible in the light of the above teachings. It is therefore to be understood that within the scope of the appended claims the invention may be practiced otherwise than as specifically described.

What is claimed is:

1. A real-time amplitude histogram shaper transforming an input signal $V_n$ according to a first histogram having levels of voltage amplitude into an output signal according to a second histogram having levels of voltage amplitude, comprising:

means for receiving an input analog signal $V_{in}$;

means, whose input is connected to the receiving means, for estimating the histogram of the input signal;

means, whose input is connected to the output of the estimating means, for computing the transfer function required to transform the input signal to an output signal with a desired amplitude histogram;

means, whose input is connected to the output of the computing means, for generating control signals;

means, one of whose two inputs is connected to the receiving means and the other to the output of the generating means, which modifies its input signals by the transfer function $g(V_{in})=V_{out}/-V_{in}$ where $V_{out}$ is the magnitude of the output voltage and $V_{in}$ is the magnitude of the input voltage, the input levels of voltage amplitude being $V_1, V_2, \ldots, V_n$, the output signal thereby having the form of the desired amplitude histogram; wherein the transfer function modifying means includes n channels, and comprises:

the means for receiving the input analog signal $V_{in}$, the means being a common junction point for the n channels;

a plurality of n means for voltage translation, one in each of n channels, each means for receiving two input signals, the signal $V_{in}$ and the signal comprising the inverted voltages $V_1, V_2, V_3, \ldots, V_n$, and for translating the input signal $V_{in}$ by the voltage $V_1, V_2, V_3, \ldots, V_n$, respectively; wherein The plurality of means for voltage translation comprises n diodes connected to the inputs of two adjacent channels, the n-th diode being connected to a source of bias voltage;

a plurality of n saturating unity-gain means, one in each of the n channels, the inputs of the n saturating means being connected to the outputs of the n translating means, each saturating means passing only the signals corresponding to an input signal within a specific voltage range;

the plurality of n saturating unit gain means comprising:

a resistor, in the range of 1k, in series in each channel, one end of the resistor in the first channel being connected to the receiving means, all of the other resistors having one end connected to the junction of two diodes; and a plurality of n double-diode clippers, one end of each being connected to the other end of the resistor, the other end of each being connected to a source of bias voltage; the transfer function modifying means further comprising:

a plurality of n means for amplifying, each having an input connected to the output of one of the saturating unity-gain means, for amplifying the signals in the first through n-th channels by a magnitude $g_1$ through $g_n$, respectively;

the plurality of means for amplifying comprising n field-effect transistors (FETs), each of whose source is connected to the junction of the resistor and the double-diode clipper, and each of whose gate is connected to the means for generating control signals; the transfer function modifying means further comprising:

a means for summing, having n inputs connected to the n outputs of the plurality of amplifying means;

the means for summing comprising:

a plurality of n resistors, in the range of 22k, one end of each being connected to the drain of the FET, the other end of each resistor being connected to a common junction; and an operational amplifier whose input is connected to the common junction of the resistors, the output signal of the summing means being the desired amplitude histogram.

* * * * *